July 5, 1966    W. R. BEHN    3,258,857
TEST RESPONSE DEVICE
Filed May 4, 1964    2 Sheets-Sheet 1

INVENTOR.
WILLIAM R. BEHN
BY
Brumbaugh, Free, Graves & Donohue
his ATTORNEYS

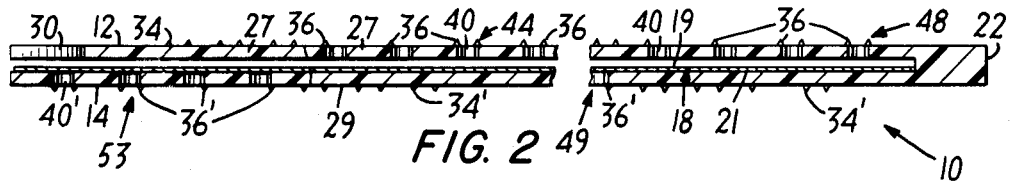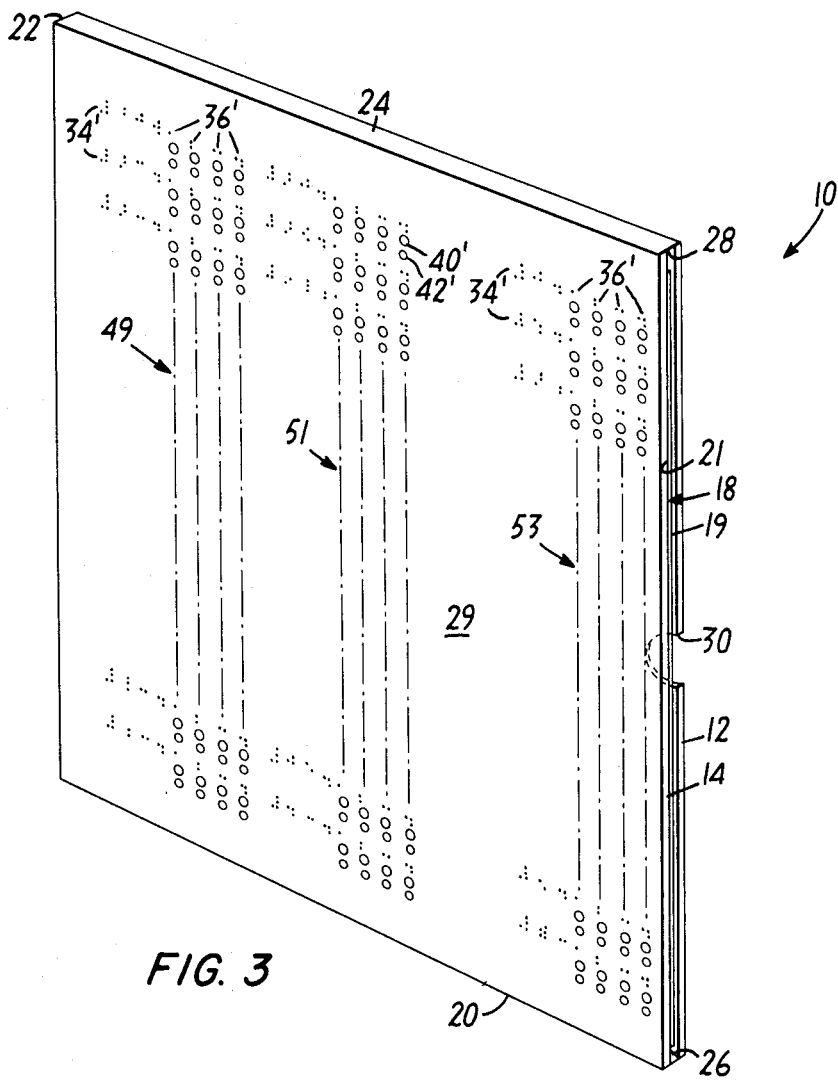

3,258,857
TEST RESPONSE DEVICE
William R. Behn, Somerville, N.J., assignor to Educational Testing Service, Princeton, N.J., a corporation of New York
Filed May 4, 1964, Ser. No. 364,478
10 Claims. (Cl. 35—48)

This invention relates to educational testing devices and, in particular, to test response templates for use by blind students when taking examinations which are to be scored and correlated by a machine.

During the past two decades the educational institutions of this country and abroad have required the development of mass testing techniques which can quickly compare levels of aptitude, ability or personality of thousands of students. As a result, a system of mass testing and analysis of scores by a single impartial organization has evolved as the most suitable means of meeting these needs of modern education.

For the organization charged with the responsibility of administering these tests and analyzing the comparative results of thousands of examinees, it is absolutely essential that the examinations be corrected by machine scoring, whether it be by use of magnetized answer markings or by the latest optical scanning means.

In order to establish a workable system of machine scoring, it is essential that the examinees mark selected answers at specific locations on the answer sheet. In the case of most examinees, it has been necessary merely to designate with faint, dotted lines the various locations at which the examinees will mark selected answers. However, in the case of blind examinees this method is obviously unfeasible and, heretofore, time-consuming, individual hand scoring has been required. To complicate the issue, during recent years, the number of blind examinees has increased substantially and the need for machine scoring of their examinations or at least a simplified hand-scoring system has become even more essential.

This invention has answered this need and provides a means which permits the machine scoring of tests taken by blind examinees by enabling the blind examinee to mark, without assistance, the precise answer locations which he has selected on an answer sheet, each location being associated with the answer which the examinee believes is correct.

Specifically, this invention comprises an envelope-shaped template constructed of a plastic or plastic-like material which is capable of receiving a sheet of paper, or answer sheet, and holding it in a specific position between the envelope's generally flat side surfaces. The external front surface of the plastic envelope has a plurality of braille representations, each of which is associated with a particular question. Each question location, in turn, has a plurality of braille representations, each of which is associated with a different answer to that question and with an adjacent aperture which passes through the front side surface of the template. Finally, a specific portion of the answer sheet which is inserted in the cavity of the template is exposed in each of these apertures.

This invention permits the blind examinee, after listening to a question and a number of answers, to select the answer which he considers to be correct and to thereupon mark the exposed answer sheet through an aperture at the specific location which is associated with that answer.

This invention has the further advantage of permitting the examinee to change his originally selected, but subsequently unintended, answer by providing two apertures associated with each braille answer representation. In this manner the blind student is provided with a simple means for correcting an erroneous answer. In selecting the second answer he may merely mark the answer sheet at points exposed below both apertures. In this case an answer with a double marking would take precedence over an answer marked only once, a step easily programmed in a scoring device or handled, on an exceptional basis, by hand scoring.

In addition, this invention discloses specific minimum dimensions between answer apertures and question locations which greatly facilitate the blind examinee's manual dexterity while taking the examination, improving both his speed in marking the answers and his agility in moving from one answer location to another.

Furthermore, this invention contemplates that the reverse side of the envelope-shaped template could be used in a similar manner, being provided with similar braille representations and apertures. The apertures on the front and back surfaces of the plastic envelope are, however, alternated or spaced so that they do not overlap and that a support is provided for the answer sheet when the examinee is marking it with a pen or the like through an aperture in the template.

Other advantages and a fuller understanding of this invention may be had by referring to the following description and claims taken in conjunction with the accompanying drawings in which:

FIGURE 2 illustrates an enlarged, partially cross-sectional side view of the test response template taken along the lines 2—2 indicated by the arrows in FIGURE 1; and FIGURE 3 shows an isometric view of the reverse side of the test response template.

Figure 1:
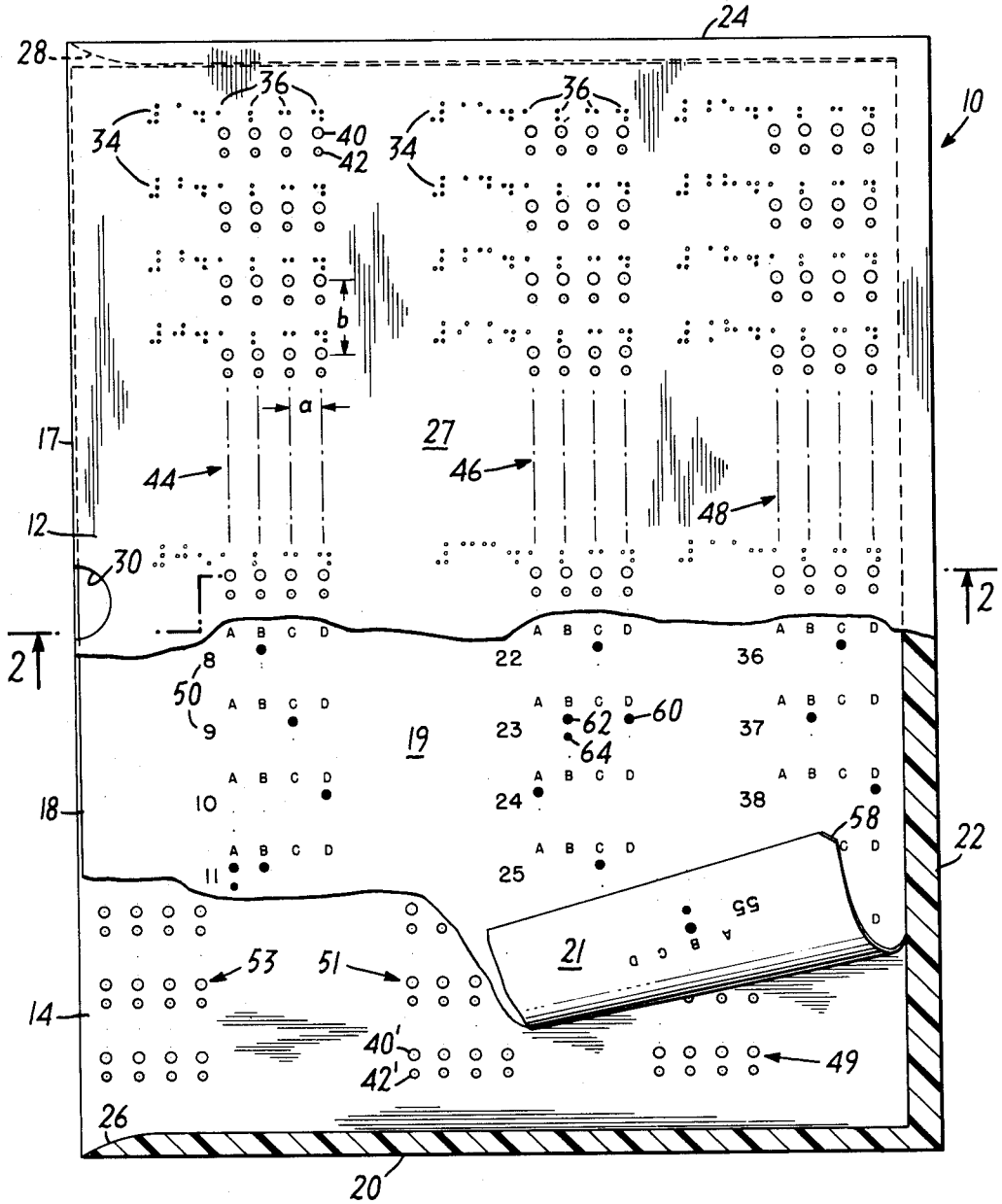
FIGURE 1 shows a partially cross-sectioned plan view of a test response template incorporating the invention holding a portion of an answer sheet which is folded back in order to expose the lower surface of the sheet.

With reference to the drawings, the invention is illustrated as being incorporated in a test response template indicated generally by the reference character 10. As illustrated in the preferred embodiment, the template 10 is composed of a first upper sheet 12 and a second lower sheet 14 composed of a relatively hard material such as plastic. Sheets 12 and 14 are separated by a long, thin cavity 16 which is open along edge 17 and designed to accommodate an answer sheet 18.

The first sheet 12 and second sheet 14 are joined by the bottom wall 22 and the side walls 20 and 24, as shown in FIG. 1, the latter two being tapered along surfaces 26 and 28, respectively, in order to facilitate the reception of answer sheet 18 within cavity 16. In addition, the first sheet 12 has a notch 30 along side edge 17 in order to further assist in the insertion or the removal of the answer sheet 18 from the cavity 16.

On the outer surface 27 of sheet 12 there are a plurality of braille representations 34 each of which associates a distinct question location with a particular question to be asked in an examination. Each question location and its braille representations 34, in turn, has a plurality of distinct answer locations 36 adjacent to it, each of which is associated with a particular answer to that question. The answer locations 36 are composed of specific braille representations 38 located directly adjacent to a large aperture 40. In the preferred embodiment shown in FIG. 1, a small aperture 42 is located directly below each large aperture 40 and both apertures 40 and 42 are of sufficient diameter to permit the point of a writing instrument such as a pen or pencil to pass through each aperture and be in a position to mark answer sheet 18 in the cavity 16.

The question locations 34 and the answer locations 36 are divided generally into three columns on the upper surface 27 of sheet 12. In the preferred embodiment question locations (1) through (14) are positioned vertically in the first column 44 while question locations (15) through (28) are positioned vertically in colmun 46 and question locations (29) through (42) are positioned vertically in column 48, as shown in FIG. 1.

The upper surface 19 of answer sheet 18 has a plurality of question locations 50, each of which has a series of answer locations labeled A, B, C and D in the preferred embodiment which are directly associated with it. These specific question locations 50 and their associated answer locations are positioned directly below corresponding positions on sheet 12, and the side walls 20 and 24, the bottom wall 22 and the answer sheet 18 are so machined that the answer locations on sheet 18 fall directly below the apertures 40 and 42 associated with each particular answer. On this manner an examinee can be directed to mark specific locations on the answer sheet.

This invention permits both sides of the answer sheet 18 to be used by the examinee by providing similar braille question representations 34', similar answer representations 36', and similar apertures 40' and 42' on the reverse side of the template or on the outer surface 29 of second sheet 14. When during the examination the examinee turns the template over onto its reverse side or onto outer surface 29, he will continue to work downwardly from the upper left-hand corner of the template.

As illustrated in FIG. 3, the outer surface 29 of sheet 14 has three columns of question representations 34' and associated answer representations 36' and answer apertures 40' and 42'. The left-most column 49 contains the question locations (43) through (55) whereas the center column 51 contains the question locations (56) through (68) and the right-hand column 53, which is adjacent open edge 17, includes question locations (69) through (81). The reverse outer surface 29 of the envelope-shaped template is, in the preferred embodiment, arranged in generally the same manner as the front outer surface 27 so that the blind examinee will not be disconcerted by a change in routine and may concentrate solely on the substantive portions of the examination, his mind free from distracting procedural changes.

The only differences between the two sides of the template described in the preferred embodiment are that front side 27 has three columns with fourteen questions in each, whereas the reverse side 29 has three columns with thirteen questions in each and that the open edge 17 and notch 30 would be on the left-hand side of the examinee when he is answering questions (1) through (42) whereas the edge 17 and notch 30 will be on the right-hand side of the examinee when he is answering questions (43) through (81).

In addition, in the preferred embodiment of this invention, notch means 58 at one corner of sheet 18 or its equivalent insures that the blind examinee will place the answer sheet 18 in the correct position within cavity 16. In this manner the blind examinee may be assured that the upper surface 19 of answer sheet 18 is directly adjacent sheet 12 of the plastic template and that the proper answer locations are thus aligned.

In the preferred embodiment, the apertures 40 and 42 in columns 44, 46 and 48 in sheet 12 are also positioned so that they are not congruent at any point with the apertures 40' and 42' in columns 49, 51 and 53 in sheet 14. By staggering the columns of apertures in both sheets, a solid support is provided beneath the answer sheet 18 either when surface 19 is being marked by a pencil or the like through apertures 40 or 42 or when the surface 21 is being marked through apertures 40' or 42'. Also in this embodiment the horizontal rows of apertures in sheet 12 are offset with respect to the horizontal rows of apertures in sheet 14. This offsetting would, of course, provide the necessary solid support opposite each aperture regardless of whether the columns are staggered on both sheets. Thus, in some embodiments where the number of answer apertures associated with each question is so great that vertical staggering will not assure a solid support beneath each aperture, the horizontal offsetting system described herein permits the maximum use of both external surfaces of the template.

Through testing it has been found that to provide a test response template which can be easily manipulated by the average blind examinee, it is desirable that the horizontal distance between the answer holes within each question grouping be not less than .250 inch from center to center as indicated by the reference character "$a$" in FIG. 1, and that the vertical distance between the adjacent answer groupings or questions be not less than .726 inch as indicated by reference character "$b$" in FIG. 1. These dimensions are illustrative of the preferred embodiment but are not to be construed as limiting the scope of this invention as hereinafter claimed.

At the beginning of the examination, the test response template 10 may be distributed to the blind examinee with the answer sheet 18 already placed within its cavity 16 or the examinee may be asked to align the notch means 58 in sheet 18 in a specific manner within the cavity 16. In either case, once the answer sheet 18 is in position, the examinee may read or listen to a test question and its various answers and then proceed to record the correct response to this question by marking the hole 40 or 40' associated with the particular answer to this question which the examinee believes is correct.

In detail, the blind examinee will locate a question by feeling the appropriate braille representation 34 associated with that question. The various answers to this question will be read aloud, say, and each will be associated with a different braille representation 36. When the examinee selects the answer which he considers is correct, he will locate with his pen, pencil or the like the large aperture 40 or 40' positioned directly below the braille representation of his choice and he then will mark the surface of sheet 18 exposed at this point.

If a student returns to a question which has been previously marked, and after re-evaluating the question decides that another answer is correct, he may blacken the response 40 or 40' and the small hole 42 or 42' directly below it. This double marking of the second answer will signify to the machine scoring device or to a hand scorer that the large mark, with a small mark below it, is the last intended response. For example, in answering question (23) on surface 12 of sheet 18 in FIG. 1, the examinee first selected answer D. Upon reconsideration, the examinee selected answer B whereupon he marked sheet 18 both through the large aperture 40 at point 62 and through small aperture 42 at point 64. It will be immediately obvious upon correction that answer B takes precedence over answer D. The examinee will proceed through the examination in a similar manner merely turning the test response template from left to right when all of the answers on the first side 27 have been completed.

Although the invention has been described with a certain degree of particularity it is to be understood that the present disclosure has been made only by way of example and that numerous changes in the details of construction and arrangement of parts may be resorted to without departing from the spirit and scope of this invention. For example, the number of answer responses may vary in number from the four shown in the preferred embodiment. Similarly, the number of columns may be more or less than three as shown in the preferred embodiment and certainly the dimensions of the template itself and the exact position of the braille representations and apertures are subject to change within the scope of this invention which shall be limited only by the following claims.

I claim:
1. A test response template, comprising
an envelope having an inner chamber and a narrow opening along one edge for receiving an answer sheet, said envelope being formed by first and sec- ond sheets, each sheet having an inner surface facing said inner chamber and an outer surface, first braille marking means on said outer surface of said first sheet associated with a particular question, a plurality of means defining a hole through said first sheet adjacent said marking means and suitable for permitting the point of a marking instrument to pass through the sheet, each of said means defining a hole associated with a different answer to said question and positioned at a location correlated with a specific location on said answer sheet when said answer sheet is inserted into said envelope, and second braille marking means on said outer surface of said first sheet adjacent each one of said means defining a hole associating it with a particular answer.

2. A test response template as defined in claim 1, wherein said plurality of means defining a hole comprises a surface area on said first sheet having a plurality of sets of apertures, each set being associated with a different answer to said question and each set having one large aperture and at least one small aperture whereby the examinee may select an answer by marking an area on said answer sheet exposed beneath said large aperture associated with the selected answer and may eliminate an originally marked, but subsequently unintended, answer by marking the area on said answer sheet beneath both the large and small apertures in the set associated with the second answer selected by the examinee.

3. A test response template as defined in claim 1, wherein said envelope is made of a plastic material.

4. A test response template as defined in claim 1, comprising first braille marking means on the outer surface of said second sheet associated with a particular question, a plurality of means defining a hole through said second sheet adjacent said marking means permitting the point of a marking instrument to pass through the sheet, each of said means defining a hole associated with a different answer to said question arranged in a nonoverlapping position with said plurality of means defining a hole in said first sheet and being positioned at a location correlated with a specific location on said answer sheet when it is inserted in said envelope, and second braille marking means on said outer surface of said second sheet adjacent each one of said means defining a hole associating it with a particular answer.

5. A test response template as defined in claim 4, wherein said plurality of means defining a hole in said first and second sheets are arranged in vertical columns on each sheet, said columns in said second sheet being staggered with respect to said columns in said first sheet whereby no hole in said second sheet overlaps a hole in said first sheet.

6. A test response template as defined in claim 4, wherein said plurality of means defining a hole in said first and second sheets are arranged in spaced horizontal lines on each sheet, said horizontal lines on said first sheet being offset with respect to said horizontal lines on said second sheet whereby no hole in said second sheet overlaps a hole in said first sheet.

7. A test response template as defined in claim 1, wherein said plurality of means defining a hole are spaced vertically by at least seven tenths of an inch.

8. A test response template as defined in claim 1, wherein said plurality of means defining a hole are spaced horizontally by at least one quarter of an inch.

9. A test response template as defined in claim 1, wherein said plurality of means defining a hole are spaced vertically by approximately seven tenths of an inch.

10. A test response template as defined in claim 1, wherein said plurality of means defining a hole are spaced horizontally by approximately one quarter of an inch.

No references cited.

EUGENE R. CAPOZIO, *Primary Examiner.*